United States Patent
Tiwari et al.

(10) Patent No.: US 11,501,189 B2
(45) Date of Patent: Nov. 15, 2022

(54) ANOMALY DETECTION USING ZONAL PARAMETER CHARACTERISTICS AND NON-LINEAR SCORING

(71) Applicant: Kyndryl, Inc., New York, NY (US)

(72) Inventors: Awadesh Tiwari, Bengaluru (IN); Amol Bhaskar Mahamuni, Bengaluru (IN); Kamalakanta Mishra, Bengaluru (IN)

(73) Assignee: Kyndryl, Inc., New York, NY (US)

( * ) Notice: Subject to any disclaimer, the term of this patent is extended or adjusted under 35 U.S.C. 154(b) by 391 days.

(21) Appl. No.: 16/792,427

(22) Filed: Feb. 17, 2020

(65) Prior Publication Data

US 2021/0256397 A1    Aug. 19, 2021

(51) Int. Cl.
*G06F 21/00* (2013.01)
*G06N 5/04* (2006.01)
*G06N 20/00* (2019.01)
*H04L 9/40* (2022.01)

(52) U.S. Cl.
CPC .............. *G06N 5/04* (2013.01); *G06N 20/00* (2019.01); *H04L 63/1425* (2013.01)

(58) Field of Classification Search
CPC .......... G06N 5/04; G06N 20/00; G06N 3/063; G06N 3/0445; G06N 3/0454; G06N 3/084; H04L 63/1425; H04L 63/1433
See application file for complete search history.

(56) References Cited

U.S. PATENT DOCUMENTS

| | | | | |
|---|---|---|---|---|
| 9,712,548 | B2 * | 7/2017 | Shmueli | H04L 63/1425 |
| 10,338,982 | B2 * | 7/2019 | Qiao | G06K 9/0055 |
| 2019/0260688 | A1 | 8/2019 | Anand et al. | |
| 2019/0340684 | A1 | 11/2019 | Belanger et al. | |
| 2020/0159624 | A1 * | 5/2020 | Malkov | G06N 20/00 |
| 2021/0072955 | A1 * | 3/2021 | Mellempudi | G06N 3/063 |

FOREIGN PATENT DOCUMENTS

| | | |
|---|---|---|
| AU | 2018203321 B2 | 5/2018 |
| JP | 2003256957 A | 9/2003 |
| WO | 2019099107 A1 | 5/2019 |

OTHER PUBLICATIONS

Paciencia, Todd J. Improving non-linear approaches to anomaly detection, class separation, and visualization. Air Force Institute of Technology ProQuest Dissertations Publishing, 2014. (Year: 2014).*
Ding et al., "RADM:Real-Time Anomaly Detection in Multivariate Time Series Based on Bayesian Network," 2018 IEEE International Conference on Smart Internet of Things (SmartIoT), Aug. 17-19, 2018, Xi'an, China, 6 pages. https://ieeexplore.ieee.org/document/8465538.

* cited by examiner

*Primary Examiner* — Kendall Dolly
(74) *Attorney, Agent, or Firm* — Yee & Associates, P.C.

(57) ABSTRACT

Anomaly detection using zonal parameter characteristics and non-linear scoring is provided. Anomalous behavior characteristics of a parameter and group of parameters are identified within time series data using an optimal artificial intelligence model of a plurality of artificial intelligence models. Anomalies are detected based on the anomalous behavior characteristics of the parameter and the group of parameters within the time series data. The anomalies are classified into a corresponding anomaly category. A root cause of the anomalies is determined based on the corresponding anomaly category. One or more action steps are performed to remediate the root cause of the anomalies.

20 Claims, 5 Drawing Sheets

ANOMALY DETECTION USING ZONAL PARAMETER CHARACTERISTICS AND NON-LINEAR SCORING

BACKGROUND

1. Field

The disclosure relates generally to anomaly detection and more specifically to anomaly detection using zonal parameter characteristics and non-linear scoring.

2. Description of the Related Art

Anomaly detection, which is also known as outlier detection, is identification of data points, events, items, observations, and the like that differ significantly from the majority of the data. Typically, the anomalous item translates to some type of problem, such as, for example, a system problem, network problem, structural defect, medical problem, or textual error. Anomalies occur infrequently, but may signify a significant problem. Anomalies may also be referred to as, for example, outliers, novelties, noise, deviations, exceptions, and the like.

Anomaly detection is applicable in a variety of domains, such as, for example, system monitoring, event detection, fault detection, intrusion detection, ecosystem disturbance detection, and the like. Successful anomaly detection relies on an ability to accurately analyze time series data in real time. Time series data is composed of a sequence of values over time. That means each point is typically a pair of two items comprising a timestamp for when the metric was measured and the value associated with that metric at that time. Time series data is a record that contains information necessary for making predictions regarding what can reasonably be expected to occur in the future. Anomaly detection systems use those predictions to identify actionable items within the data by uncovering outliers in key performance indicators, for example, and sending alerts.

Univariate anomaly detection detects outliers from a distribution of values in a single feature space. That is, spotting outliers for one parameter at a time. Multivariate anomaly detection detects outliers for two or more parameters at a time.

Typically, anomalies fall into one of three main categories: point anomalies, contextual anomalies, and collective anomalies. Point anomalies, also called global anomalies, are outliers that exist outside the entirety of a data set. Contextual outliers, also called conditional outliers, are anomalies that have values significantly deviating from other data points that exist in the same context. For example, an anomaly in the context of one data set may not be an anomaly in another data set. This type of outlier is common in time series data because these data sets are records of specific values in a given time period. The values may exist within expectations, but may appear anomalous within certain contextual data patterns. Collective outliers are when a subset of data points within a set is anomalous to the entire data set. In this category, individual values are not anomalous globally or contextually. This type of outlier is observed when examining different time series together. Individual behavior may not deviate from the normal range in a specific time series data set. When combined with another time series data set, behavioral anomalies may become more apparent.

SUMMARY

According to one illustrative embodiment, a computer-implemented method for anomaly detection using zonal parameter characteristics and non-linear scoring is provided. A computer identifies anomalous behavior characteristics of a parameter and group of parameters within time series data using an optimal artificial intelligence model of a plurality of artificial intelligence models. The computer detects anomalies based on the anomalous behavior characteristics of the parameter and the group of parameters within the time series data. The computer classifies the anomalies into a corresponding anomaly category. The computer determines a root cause of the anomalies based on the corresponding anomaly category. The computer performs one or more action steps to remediate the root cause of the anomalies. According to other illustrative embodiments, a computer system and computer program product for anomaly detection using zonal parameter characteristics and non-linear scoring are provided.

DETAILED DESCRIPTION

Figure 1:
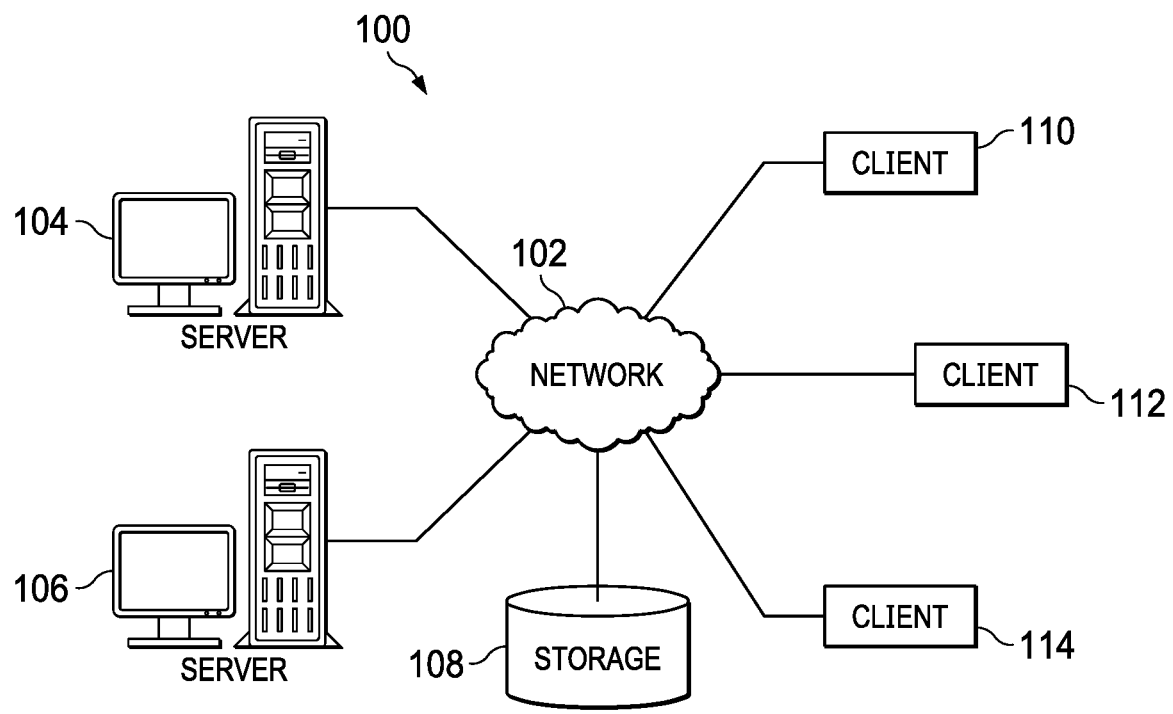
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
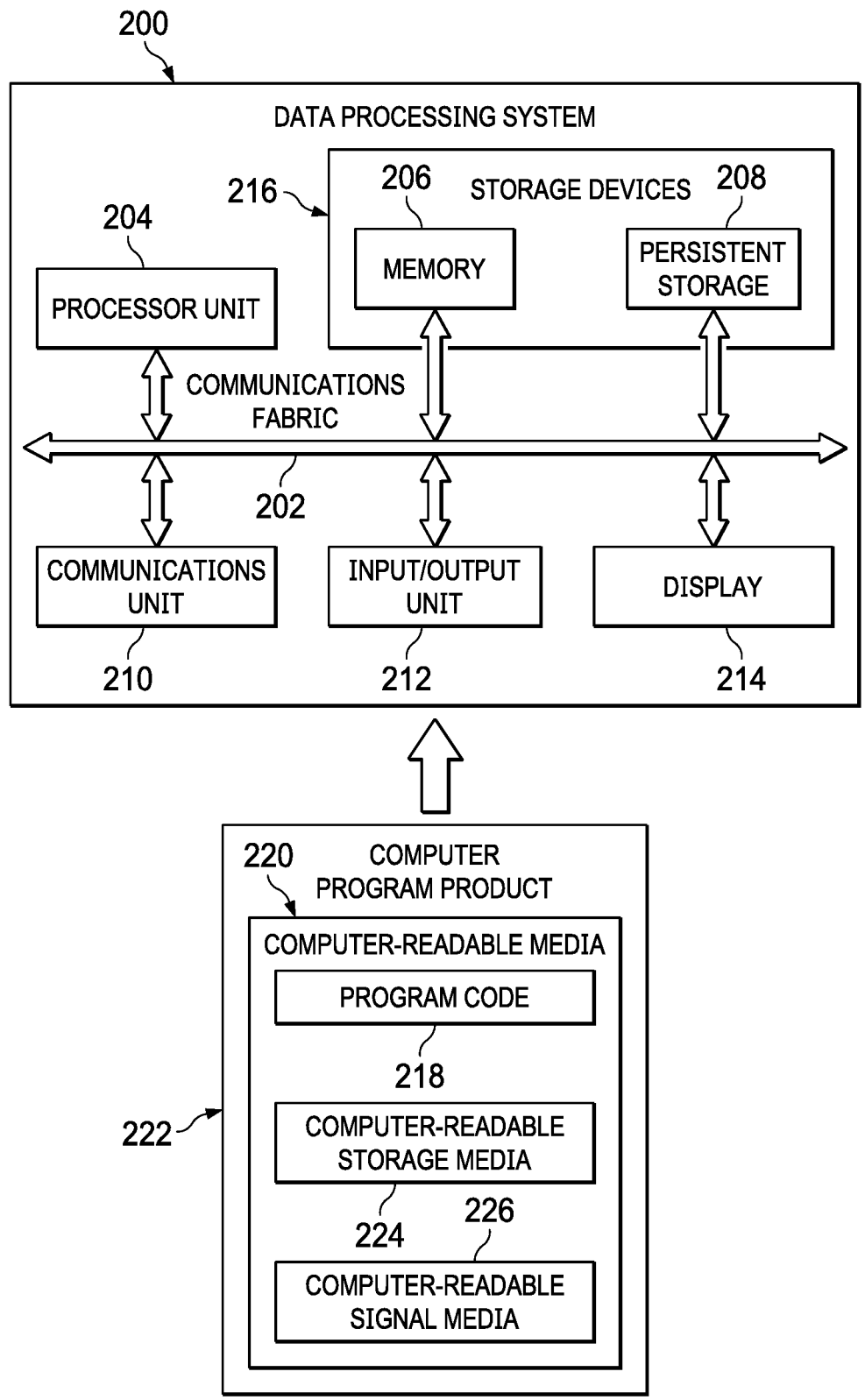
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide anomaly detection services for registered client devices. For example, server 104 and server 106 may detect anomalies within time series data received from registered client devices based on identifying zonal parameter behavior characteristics and generating non-linear scores for artificial intelligence models processing the zonal parameter behavior characteristics of the time series data. The time series data may be any type of time series data, such as, for example, Internet of Things data, Information Technology data, sensor data, financial data, transaction data, streaming data, and the like.

Client 110, client 112, and client 114 also connect to network 102. Clients 110, 112, and 114 are registered clients of server 104 and server 106 that send time series data to server 104 and server 106 for anomaly detection. Clients 110, 112, and 114 may represent any type of data processing system, such as, for example, network computers, laptop computers, handheld computers, smart phones, smart watches, smart televisions, smart appliances, smart vehicles, gaming devices, and the like, with wire or wireless communication links to network 102.

Storage 108 is a network storage device capable of storing any type of data in a structured format or an unstructured format. In addition, storage 108 may represent a plurality of network storage devices. Further, storage 108 may store, for example, identifiers and network addresses for a plurality of different client devices and the like. Furthermore, storage 108 may store other types of data, such as authentication or credential data that may include user names, passwords, and biometric data associated with system analysts and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In other words, data processing system 200 is capable of performing anomaly detection in received time series data using zonal parameter behavioral characteristics and non-linear scoring. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224 or computer readable signal media 226.

In these illustrative examples, computer readable storage media 224 is a physical or tangible storage device used to store program code 218 rather than a medium that propagates or transmits program code 218. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 220" can be singular or plural. For example, program code 218 can be located in computer readable media 220 in the form of a single storage device or system. In another example, program code 218 can be located in computer readable media 220 that is distributed in multiple data processing systems. In other words, some instructions in program code 218 can be located in one data processing system while other instructions in program code 218 can be located in one or more other data processing systems. For example, a portion of program code 218 can be located in computer readable media 220 in a server computer while another portion of program code 218 can be located in computer readable media 220 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 218.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Anomaly detection has been an issue in research areas of every industry in some form or another. One challenge associated with anomaly detection is how to apply machine learning to pre-empt anomalies. Reactive solutions, which involve post incident or post threshold detection, are currently used today. In addition, current solutions are data domain specific. Further, current solutions are dependent on fixed or a priori defined thresholds. These fixed threshold-based solutions wait for a process to remain out of limits for a fixed time interval, then identify the behaviour as anomalous and invoke investigation by support services. However, a subject matter expert has to manually scan through the information and identify whether issues raised by these current solutions are really anomalous or not.

Illustrative embodiments take into account and address the multiple challenges regarding anomaly detection in most of today's online time series data, which may include anomalies that may provide significant information about rare behavior. For example, illustrative embodiments are capable of anomaly detection and prediction for Internet of Things data, as well as Information Technology data. However, it should be noted that illustrative embodiments are capable of detecting and predicting anomalies in any data type (i.e., not data domain specific to a particular industry). Illustrative embodiments also classify anomalies into various categories. Illustrative embodiments utilize non-linear, scoring-based artificial intelligence models to predict and detect anomalies and recommend next action steps for remediation to pre-empt predicted anomalies. Thus, illustrative embodiments are capable of working without subject matter expert involvement.

Illustrative embodiments assemble parameters (i.e., univariate parameters) and groups of parameters (i.e., multivariate parameters) within time series data into different zones. It should be noted that the parameters may be any type of parameter. For example, the parameters may be system parameters, business parameters, or the like, which may include key performance indicators, metrics data, event logs, system level notifications, sensor readings, or the like. Illustrative embodiments identify and derive these zones using, for example, an auto-detection engine. Illustrative embodiments analyze second order nature of an initial point and a final point of the parameters for a given period of time or an interval of time. In other words, illustrative embodiments identify relationships between parameters within defined beginning and ending points of the given time period. Illustrative embodiments group together all similar behaviour characteristics of the parameters into one zone for the given time period. Each zone contains a particular set of similar parameter behaviour characteristics within the time series data. Illustrative embodiments mark the different zones throughout the time series data.

Once illustrative embodiments mark the zones in the time series data, illustrative embodiments use each zone as input to a plurality of artificial intelligence models. Illustrative embodiments may utilize, for example, a hierarchical temporal memory as the artificial intelligence models. Hierarchical temporal memory is a biologically constrained model of artificial intelligence. Hierarchical temporal memory comprises learning algorithms, such as, for example, cortical learning algorithms, which can store, learn, infer, and recall high-order sequences. Unlike most machine learning methods, hierarchical temporal memory learns, in an unsupervised manner, time-based patterns in unlabeled data on a continuous basis. Hierarchical temporal memory has high capacity, which means that hierarchical temporal memory can learn multiple patterns simultaneously. Thus, hierarchical temporal memory is well-suited for anomaly detection, prediction, classification, and the like. However, it should be noted that the plurality of artificial intelligence models can be a combination of multiple techniques that include hierarchical temporal memory. In other words, the plurality of artificial intelligence models can be all hierarchical temporal memory or hierarchical temporal memory and other models.

Also, illustrative embodiments may utilize different types of hierarchical temporal memory.

Further, illustrative embodiments utilize, for example, a non-linear scoring engine to score each artificial intelligence model in the plurality of artificial intelligence models corresponding to a particular zone within the time series data. Based on the non-linear scoring of each artificial intelligence model for a zone, illustrative embodiments generate anomalous behaviour characteristics for a parameter or group of parameters in that zone. For example, illustrative embodiments compare the non-linear scores of the artificial intelligence models corresponding to a particular zone to determine an optimal artificial intelligence model for that zone (e.g., the artificial intelligence model having the highest non-linear score for that zone based on the comparison). Then, illustrative embodiments generate anomalous behaviour characteristics for a parameter or group of parameters in that particular zone using the optimum artificial intelligence model for that particular zone. Afterward, illustrative embodiments classify anomalies into various categories, such as, for example, a point anomaly category, a contextual anomaly category, or a collective anomaly category, based on the anomalous behaviour characteristics.

As an illustrative example, assume that "zone1" is a second order curve of anomalous behaviour characteristics, "zone2" is a ramp, and "zone3" is a spline. The resultant example model non-linear scoring and effectiveness equations are as follows:

model1_non_linear scoring=zone1_weights$^2$+
zone1_weights+$c1(t)$~zone2*$c2(t)$~zone3$^3$+
zone3$^2$+zone3+$c3(t)$ ... +beta($t$)*$A$.

model1effectiveness=Exp{[error metrics($t$)+accuracy ($t$)]}/model1_non_linear_scoring.

Illustrative embodiments utilize the effectiveness of each artificial intelligence model for a function of time to characterize the anomalous behavior of each parameter or group of parameters in that particular zone and then utilize the anomalous behaviour characteristics to classify the detected anomalies into an anomaly category. Based on the anomaly category, illustrative embodiments determine a root cause of an anomaly and automatically perform a set of one or more action steps to pre-empt, prevent, or remediate the anomaly. In addition to, or instead of, illustrative embodiments automatically performing the set of action steps, illustrative embodiments send a notification to a system or security analyst, for example, regarding the root cause of the anomaly and recommending the set of action steps to be taken to pre-empt or remediate the anomaly.

As a result, illustrative embodiments are not data domain specific (e.g., can be applied to any industry) and are not dependent on fixed threshold levels. Moreover, illustrative embodiments are capable of detecting root causes of anomalies and automatically taking action to pre-empt or remediate the root causes of the anomalies without subject matter expert intervention.

Thus, illustrative embodiments provide one or more technical solutions that overcome a technical problem with identifying anomalies in time series data containing both univariate and multivariate parameters without using fixed thresholds or subject matter expert involvement. As a result, these one or more technical solutions provide a technical effect and practical application in the field of anomaly detection.

Figure 3:
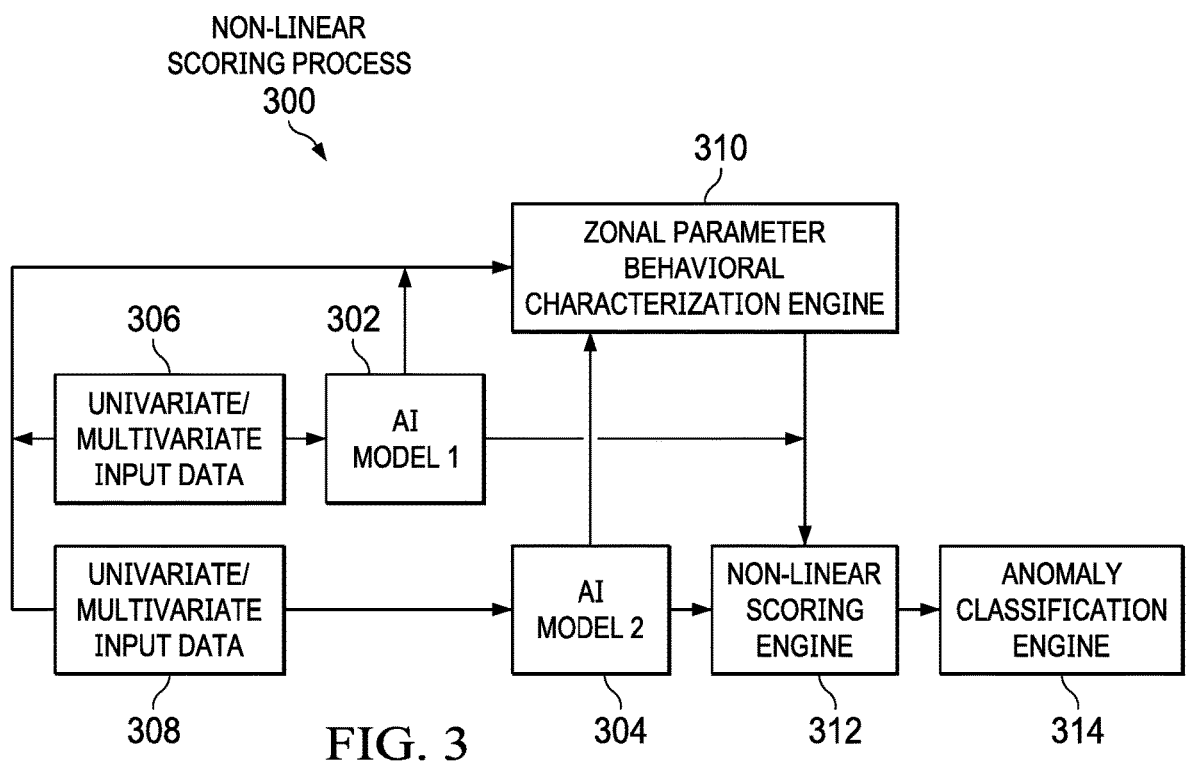
FIG. 3 is a diagram illustrating an example of a non-linear scoring process in accordance with an illustrative embodiment.

With reference now to FIG. 3, a diagram illustrating an example of a non-linear scoring process is depicted in accordance with an illustrative embodiment. Non-linear scoring process 300 may be implemented in a computer, such as, for example, server 104 in FIG. 1 or data processing system 200 in FIG. 2.

Non-linear scoring process 300 utilizes multiple algorithms and the weighted average of various parameters to use and leverage aspects of those parameters. In this example, non-linear process 300 utilizes artificial intelligence model 1 302 and artificial intelligence model 2 304. Artificial intelligence model 1 302 and artificial intelligence model 2 304 may be, for example, hierarchical temporal memory. In addition, it should be noted that non-linear process 300 may utilize any number of artificial intelligence models.

Artificial intelligence model 1 302 and artificial intelligence model 2 304 receive as input univariate parameters and multivariate parameters 306 and univariate parameters and multivariate parameters 308, respectively. Non-linear process 300 then utilizes zonal parameter behavioral characterization engine 310 to scan through portions of a parameter curve and self-learn the parameter behavioral characteristics of each zone within a defined time interval of the time series data. Zonal parameter behavioral characterization engine 310 generates a non-linear transfer function for each zone of parameter curves. A transfer function models an output for each possible input within a range of possible inputs.

Based on a form of the non-linear transfer function, zonal parameter behavioral characterization engine 310 defines auto-trained criteria to classify whether parameter behavior is anomalous (i.e., abnormal) or non-anomalous (i.e., normal). Once zonal parameter behavioral characterization is completed, non-linear scoring engine 312 generates a non-linear score for each of artificial intelligence model 1 302 and artificial intelligence model 2 304. In response to scoring artificial intelligence model 1 302 and artificial intelligence model 2 304, non-linear scoring engine 312 determines which model is a dominating model in terms of error metrics and accuracy based on respective non-linear scores. Afterward, non-linear scoring engine 312 invokes anomaly classification engine 314. Anomaly classification engine 314 classifies each detected and predicted zonal anomaly as a point anomaly, a collective anomaly, or a contextual anomaly.

Figure 4:
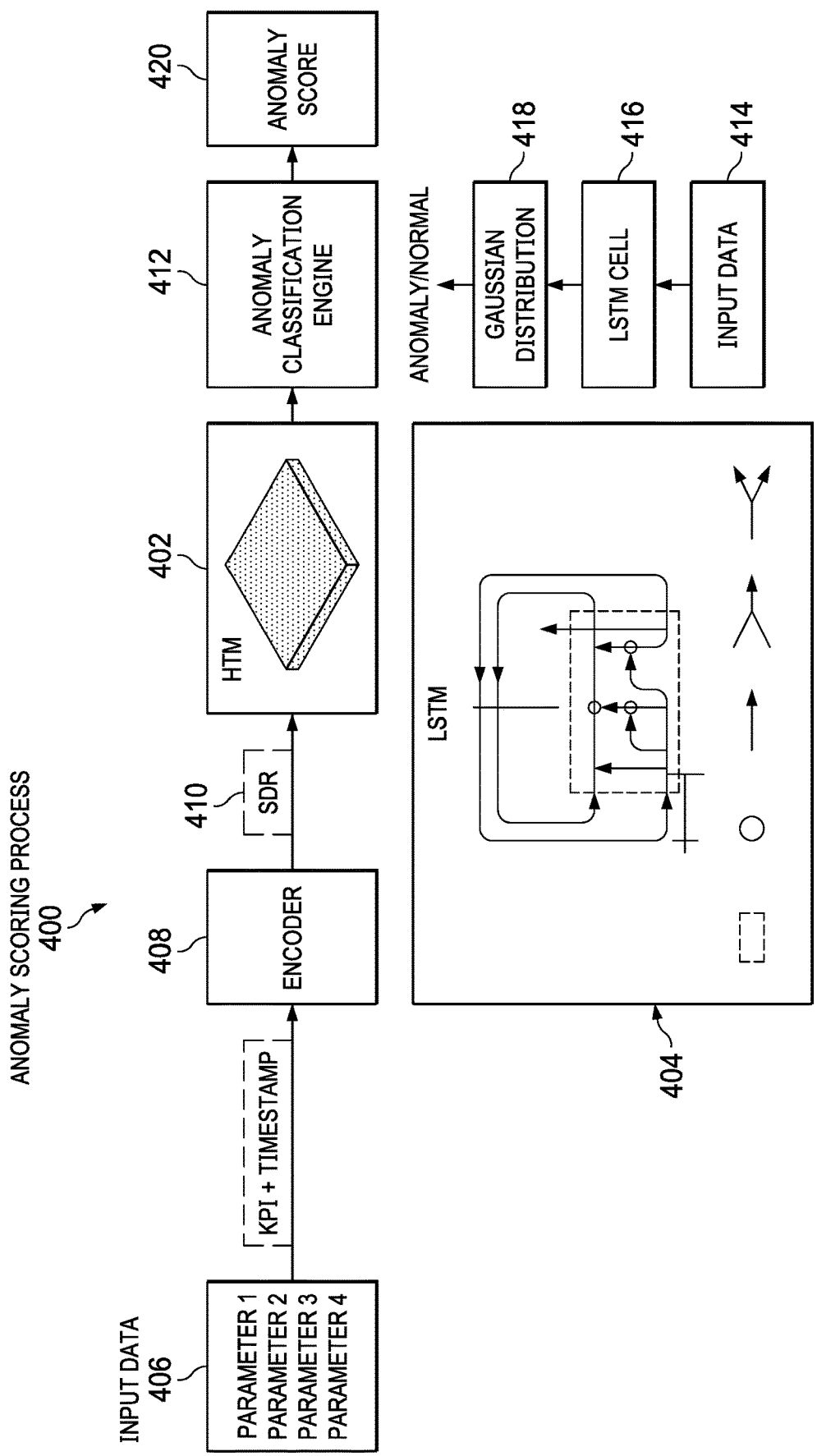
FIG. 4 is a diagram illustrating an example of an anomaly scoring process in accordance with an illustrative embodiment.

FIG. 4 is a diagram illustrating an example of an anomaly scoring process in accordance with an illustrative embodiment. Anomaly scoring process 400 may be implemented in a computer, such as, for example, server 104 in FIG. 1 or data processing system 200 in FIG. 2.

In this example, anomaly scoring process 400 utilizes hierarchical temporal memory (HTM) 402 and long short-term memory (LSTM) 404. Anomaly scoring process 400 receives input data 406, which in this example includes parameter 1, parameter 2, parameter 3, and parameter 4. However, it should be noted that input data 406 may include any number of parameters. In addition, input data 406 includes univariate and multivariate parameters. Further, in this example, input data 406 are key performance indicators with corresponding timestamps. However, it should be noted that input data 406 may include any type of parameters, such as metrics, log entries, sensor readings, or the like.

Then, anomaly scoring process 400 utilizes encoder 408 to convert input data 406 (i.e., parameters 1-4) into sparse distributed representation 410, which is in a form of bit arrays. Anomaly scoring process 400 inputs sparse distributed representation 410 into hierarchical temporal memory 402. Hierarchical temporal memory 402 may utilize, for example, a cortical learning algorithm to determine whether parameter behavior is anomalous or non-anomalous. Hierarchical temporal memory 402 inputs detected anomalous parameter behavior into anomaly classification engine 412 for anomaly classification.

Moreover, anomaly scoring process 400 inputs input data 414, which is the same as input data 406 (i.e., parameters 1-4), into long short-term memory (LSTM) cell 416 of long short-term memory 404. A long short-term memory is an artificial recurrent neural network architecture used for deep learning. Unlike standard feedforward neural networks, a long short-term memory has feedback connections (i.e., backpropagation). A long short-term memory not only can process single data points, but also can process entire sequences of data, which makes a long short-term memory applicable to anomaly detection. A long short-term memory is typically composed of a cell, such as long short-term memory cell 416, which is comprised of an input gate, an output gate, and a forget gate. The cell remembers values over arbitrary time intervals and the three gates regulate the flow of information into and out of the cell.

Long short-term memory cell 416 utilizes Gaussian distribution 418 to determine whether parameters 1-4 are anomalous or normal (i.e., non-anomalous). Long short-term memory cell 416 also inputs detected anomalous parameters into anomaly classification engine 412 for anomaly classification.

Based on inputs from hierarchical temporal memory 402 and long short-term memory cell 416, anomaly classification engine 412 classifies each of the detected anomalies into an anomaly category. Further, anomaly scoring process 400 derives anomaly score 420 for each detected anomaly based on anomaly category.

Figure 5:
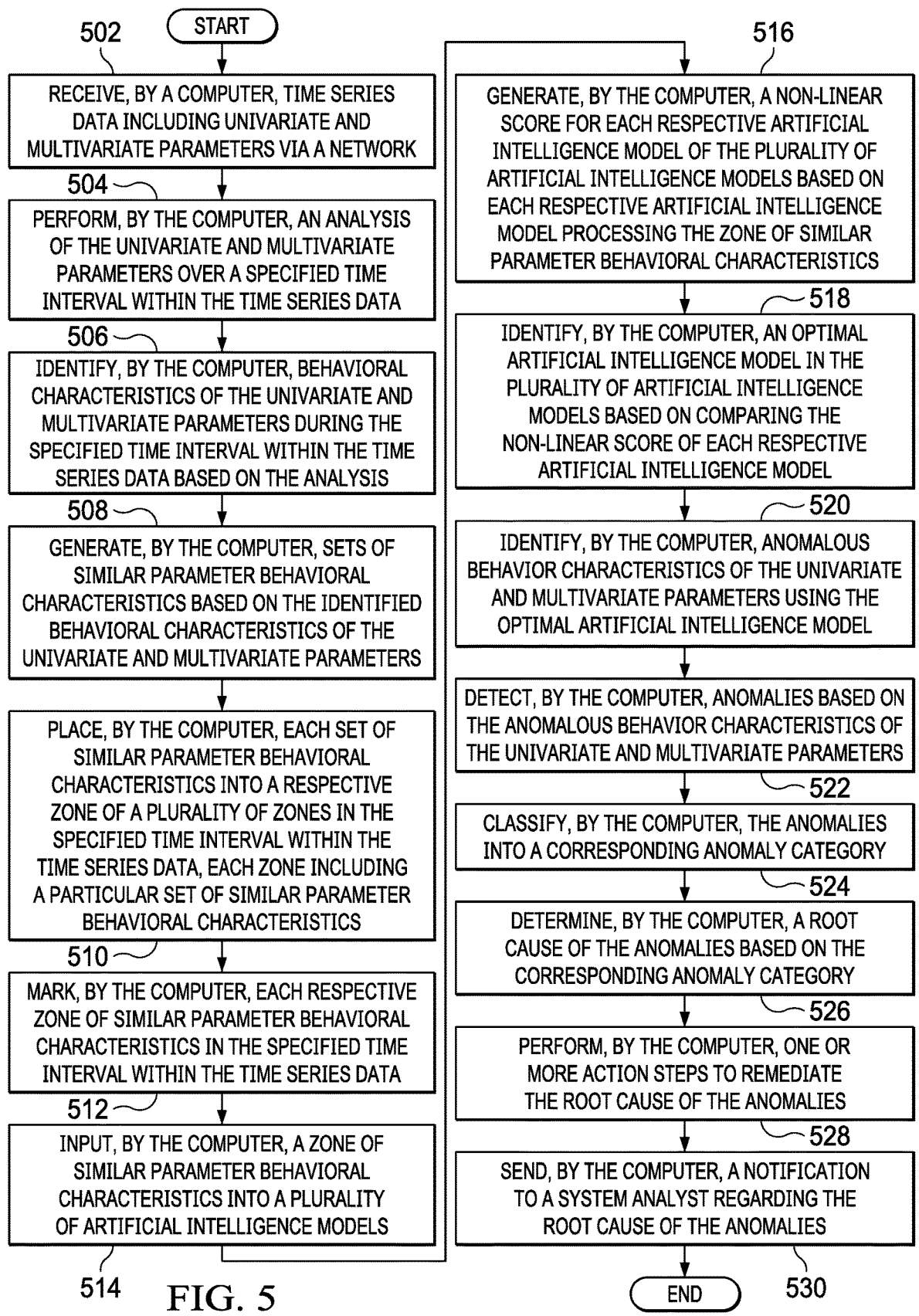
FIG. 5 is a flowchart illustrating a process for anomaly detection using zonal parameter characteristics and non-linear scoring in accordance with an illustrative embodiment.

With reference now to FIG. 5, a flowchart illustrating a process for anomaly detection using zonal parameter characteristics and non-linear scoring is shown in accordance with an illustrative embodiment. The process shown in FIG. 5 may be implemented in a computer, such as, for example, server 104 in FIG. 1 or data processing system 200 in FIG. 2.

The process begins when the computer receives time series data including univariate and multivariate parameters from a client device via a network (step 502). The computer performs an analysis of the univariate and multivariate parameters over a specified time interval within the time series data (step 504). The specified time interval may be any interval of time, such as, for example, 5 minutes or depending on the sampling rate at which data is acquired by the Internet of Things devices. This time interval can also be a duration of zones that is created by the auto-detection engine of illustrative embodiments, such as, for example, actual or past zone and predicted or future zone, irrespective of time interval. The computer identifies behavioral characteristics of the univariate and multivariate parameters during the specified time interval within the time series data based on the analysis (step 506). Behavioral characteristics for an Information Technology system, for example, may be CPU versus time and rate of change of CPU with time, as well as criticality of application. Thus, in this example, the parameter is CPU, time, impact, business key performance indicator, and application, as well as attached application criticality score.

Afterward, the computer generates sets of similar parameter behavioral characteristics based on the identified behavioral characteristics of the univariate and multivariate parameters (step 508). The computer places each set of similar parameter behavioral characteristics into a respective zone of a plurality of zones in the specified time interval within the time series data (step 510). In other words, each zone includes a particular set of similar parameter behavioral characteristics. In addition, the computer marks each respective zone of similar parameter behavioral characteristics in the specified time interval within the time series data (step 512).

Then, the computer inputs a zone of similar parameter behavioral characteristics into a plurality of artificial intelligence models (step 514). Further, the computer generates a non-linear score for each respective artificial intelligence model of the plurality of artificial intelligence models based on each respective artificial intelligence model processing the zone of similar parameter behavioral characteristics (step 516). Furthermore, the computer identifies an optimal artificial intelligence model in the plurality of artificial intelligence models based on comparing the non-linear score of each respective artificial intelligence model (step 518).

Moreover, the computer identifies anomalous behavior characteristics of the univariate and multivariate parameters using the optimal artificial intelligence model (step 520). The computer detects anomalies based on the anomalous behavior characteristics of the univariate and multivariate parameters (step 522). The computer also classifies the anomalies into a corresponding anomaly category (step 524).

Subsequently, the computer determines a root cause of the anomalies based on the corresponding anomaly category (step 526). The computer automatically performs one or more action steps to remediate the root cause of the anomalies (step 528). Various action steps that the computer may automatically perform may include, for example: 1) analyses nature of anomalies and assigning identifier tags to indicate whether an anomaly is a point, contextual, or collective anomaly; 2) based on anomaly scores, the computer assigns behavior of one zone to the application and behavior impact during that point of time, and generates remediation based on expected behavior; and 3) expected behavior is either pre-populated or manually fed by a subject matter expert. In addition to, or instead of, the computer automatically performing the action steps to remediate the root cause of the anomalies, the computer sends, via the network, a notification to a system analyst regarding the root cause of the anomalies and recommended action steps to take (step 530). Remediation action steps to be performed may be based on either pre-populated actions versus behavior mapping or manually fed actions that the subject matter expert of the system deems appropriate based on the behavior. For example, if CPU behavior for a zone appears anomalous, then the computer looks at the application running, also looks at predicted future behavior, as well past behavior, for the same system versus time and applications and business key performance indicators as response time. If all these appear to be "non-obvious", then the computer initiates process kill or diversion of work load actions to clear the anomalies. Thereafter, the process terminates.

Thus, illustrative embodiments of the present invention provide a computer-implemented method, computer system, and computer program product for anomaly detection using zonal parameter characteristics and non-linear scoring. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for anomaly detection using zonal parameter characteristics and non-linear scoring, the computer-implemented method comprising:
   identifying, by a computer, anomalous behavior characteristics of a parameter and group of parameters within time series data using an optimal artificial intelligence model of a plurality of artificial intelligence models;
   detecting, by the computer, anomalies based on the anomalous behavior characteristics of the parameter and the group of parameters within the time series data;
   classifying, by the computer, the anomalies into a corresponding anomaly category;
   determining, by the computer, a root cause of the anomalies based on the corresponding anomaly category; and
   performing, by the computer, one or more action steps to remediate the root cause of the anomalies and pre-empt the anomalies.

2. The computer-implemented method of claim 1 further comprising:
   receiving, by the computer, the time series data including the parameter and the group of parameters from a client device via a network;
   performing, by the computer, an analysis of the parameter and the group of parameters over a specified time interval within the time series data; and
   identifying, by the computer, behavioral characteristics of the parameter and the group of parameters during the specified time interval within the time series data based on the analysis.

3. The computer-implemented method of claim 1 further comprising:
   inputting, by the computer, a zone of similar parameter behavioral characteristics into the plurality of artificial intelligence models.

4. The computer-implemented method of claim 1 further comprising:
   sending, by the computer, a notification to a system analyst regarding the root cause of the anomalies.

5. The computer-implemented method of claim 1 further comprising:
   converting, by the computer, the parameter and the group of parameters into a sparse distributed representation in a form of bit arrays; and
   inputting, by the computer, the sparse distributed representation into the optimal artificial intelligence model to determine whether parameter behavior is anomalous or non-anomalous.

6. The computer-implemented method of claim 1, wherein the plurality of artificial intelligence models is hierarchical temporal memory.

7. The computer-implemented method of claim 1, wherein the parameter is a univariate parameter, and wherein the group of parameters is multivariate parameters.

8. A computer-implemented method for anomaly detection using zonal parameter characteristics and non-linear scoring, the computer-implemented method comprising:
   identifying, by a computer, anomalous behavior characteristics of a parameter and group of parameters within time series data using an optimal artificial intelligence model of a plurality of artificial intelligence models;
   detecting, by the computer, anomalies based on the anomalous behavior characteristics of the parameter and the group of parameters within the time series data;
   classifying, by the computer, the anomalies into a corresponding anomaly category;
   determining, by the computer, a root cause of the anomalies based on the corresponding anomaly category;
   performing, by the computer, one or more action steps to remediate the root cause of the anomalies;
   receiving, by the computer, the time series data including the parameter and the group of parameters from a client device via a network;
   performing, by the computer, an analysis of the parameter and the group of parameters over a specified time interval within the time series data;
   identifying, by the computer, behavioral characteristics of the parameter and the group of parameters during the specified time interval within the time series data based on the analysis;
   generating, by the computer, sets of similar parameter behavioral characteristics based on identified behavioral characteristics of the parameter and the group of parameters;
   placing, by the computer, each set of similar parameter behavioral characteristics into a respective zone of a plurality of zones in the specified time interval within the time series data, each zone including a particular set of similar parameter behavioral characteristics; and
   marking, by the computer, each respective zone of similar parameter behavioral characteristics in the specified time interval within the time series data.

9. A computer-implemented method for anomaly detection using zonal parameter characteristics and non-linear scoring, the computer-implemented method comprising:
   identifying, by a computer, anomalous behavior characteristics of a parameter and group of parameters within time series data using an optimal artificial intelligence model of a plurality of artificial intelligence models;
   detecting, by the computer, anomalies based on the anomalous behavior characteristics of the parameter and the group of parameters within the time series data;
   classifying, by the computer, the anomalies into a corresponding anomaly category;
   determining, by the computer, a root cause of the anomalies based on the corresponding anomaly category;
   performing, by the computer, one or more action steps to remediate the root cause of the anomalies;
   inputting, by the computer, a zone of similar parameter behavioral characteristics into the plurality of artificial intelligence models;
   generating, by the computer, a non-linear score for each respective artificial intelligence model of the plurality of artificial intelligence models based on each respective artificial intelligence model processing the zone of similar parameter behavioral characteristics; and
   identifying, by the computer, the optimal artificial intelligence model in the plurality of artificial intelligence models based on comparing the non-linear score of each respective artificial intelligence model.

10. A computer system for anomaly detection using zonal parameter characteristics and non-linear scoring, the computer system comprising:
    a bus system used to implement communications;
    a storage device connected to the bus system, wherein the storage device stores program instructions; and
    a processor connected to the bus system, wherein the processor executes the program instructions to:

identify anomalous behavior characteristics of a parameter and group of parameters within time series data using an optimal artificial intelligence model of a plurality of artificial intelligence models;

detect anomalies based on the anomalous behavior characteristics of the parameter and the group of parameters within the time series data;

classify the anomalies into a corresponding anomaly category;

determine a root cause of the anomalies based on the corresponding anomaly category; and perform one or more action steps to remediate the root cause of the anomalies and pre-empt the anomalies.

11. The computer system of claim 10, wherein the processor further executes the program instructions to:

receive the time series data including the parameter and the group of parameters from a client device via a network;

perform an analysis of the parameter and the group of parameters over a specified time interval within the time series data; and identify behavioral characteristics of the parameter and group of parameters during the specified time interval within the time series data based on the analysis.

12. The computer system of claim 10, wherein the processor further executes the program instructions to:

input a zone of similar parameter behavioral characteristics into the plurality of artificial intelligence models.

13. A computer system for anomaly detection using zonal parameter characteristics and non-linear scoring, the computer system comprising:

a bus system used to implement communications;

a storage device connected to the bus system, wherein the storage device stores program instructions; and a processor connected to the bus system, wherein the processor executes the program instructions to:

identify anomalous behavior characteristics of a parameter and group of parameters within time series data using an optimal artificial intelligence model of a plurality of artificial intelligence models;

detect anomalies based on the anomalous behavior characteristics of the parameter and the group of parameters within the time series data;

classify the anomalies into a corresponding anomaly category;

determine a root cause of the anomalies based on the corresponding anomaly category;

perform one or more action steps to remediate the root cause of the anomalies;

receive the time series data including the parameter and the group of parameters from a client device via a network;

perform an analysis of the parameter and the group of parameters over a specified time interval within the time series data;

identify behavioral characteristics of the parameter and group of parameters during the specified time interval within the time series data based on the analysis generate sets of similar parameter behavioral characteristics based on identified behavioral characteristics of the parameter and the group of parameters;

place each set of similar parameter behavioral characteristics into a respective zone of a plurality of zones in the specified time interval within the time series data, each zone including a particular set of similar parameter behavioral characteristics; and mark each respective zone of similar parameter behavioral characteristics in the specified time interval within the time series data.

14. A computer system for anomaly detection using zonal parameter characteristics and non-linear scoring, the computer system comprising:

a bus system used to implement communications;

a storage device connected to the bus system, wherein the storage device stores program instructions; and a processor connected to the bus system, wherein the processor executes the program instructions to:

identify anomalous behavior characteristics of a parameter and group of parameters within time series data using an optimal artificial intelligence model of a plurality of artificial intelligence models;

detect anomalies based on the anomalous behavior characteristics of the parameter and the group of parameters within the time series data;

classify the anomalies into a corresponding anomaly category;

determine a root cause of the anomalies based on the corresponding anomaly category;

perform one or more action steps to remediate the root cause of the anomalies;

input a zone of similar parameter behavioral characteristics into the plurality of artificial intelligence models;

generate a non-linear score for each respective artificial intelligence model of the plurality of artificial intelligence models based on each respective artificial intelligence model processing the zone of similar parameter behavioral characteristics; and identify the optimal artificial intelligence model in the plurality of artificial intelligence models based on comparing the non-linear score of each respective artificial intelligence model.

15. A computer program product for anomaly detection using zonal parameter characteristics and non-linear scoring, the computer program product comprising a computer readable storage medium having program instructions embodied therewith, the program instructions, when executed by a computer, cause the computer to perform a method comprising:

identifying, by the computer, anomalous behavior characteristics of a parameter and group of parameters within time series data using an optimal artificial intelligence model of a plurality of artificial intelligence models;

detecting, by the computer, anomalies based on the anomalous behavior characteristics of the parameter and the group of parameters within the time series data;

classifying, by the computer, the anomalies into a corresponding anomaly category;

determining, by the computer, a root cause of the anomalies based on the corresponding anomaly category; and performing, by the computer, one or more action steps to remediate the root cause of the anomalies and pre-empt the anomalies.

16. The computer program product of claim 15 further comprising:

receiving, by the computer, the time series data including the parameter and the group of parameters from a client device via a network;

performing, by the computer, an analysis of the parameter and the group of parameters over a specified time interval within the time series data; and identifying, by the computer, behavioral characteristics of the parameter and the group of parameters during the specified time interval within the time series data based on the analysis.

17. The computer program product of claim 15 further comprising:
inputting, by the computer, a zone of similar parameter behavioral characteristics into the plurality of artificial intelligence models.

18. The computer program product of claim 15 further comprising:
sending, by the computer, a notification to a system analyst regarding the root cause of the anomalies.

19. A computer program product for anomaly detection using zonal parameter characteristics and non-linear scoring, the computer program product comprising a computer readable storage medium having program instructions embodied therewith, the program instructions, when executed by a computer, cause the computer to perform a method comprising:
identifying, by the computer, anomalous behavior characteristics of a parameter and group of parameters within time series data using an optimal artificial intelligence model of a plurality of artificial intelligence models;
detecting, by the computer, anomalies based on the anomalous behavior characteristics of the parameter and the group of parameters within the time series data;
classifying, by the computer, the anomalies into a corresponding anomaly category;
determining, by the computer, a root cause of the anomalies based on the corresponding anomaly category;
performing, by the computer, one or more action steps to remediate the root cause of the anomalies;
receiving, by the computer, the time series data including the parameter and the group of parameters from a client device via a network;
performing, by the computer, an analysis of the parameter and the group of parameters over a specified time interval within the time series data;
identifying, by the computer, behavioral characteristics of the parameter and the group of parameters during the specified time interval within the time series data based on the analysis;
generating, by the computer, sets of similar parameter behavioral characteristics based on identified behavioral characteristics of the parameter and the group of parameters;
placing, by the computer, each set of similar parameter behavioral characteristics into a respective zone of a plurality of zones in the specified time interval within the time series data, each zone including a particular set of similar parameter behavioral characteristics; and
marking, by the computer, each respective zone of similar parameter behavioral characteristics in the specified time interval within the time series data.

20. A computer program product for anomaly detection using zonal parameter characteristics and non-linear scoring, the computer program product comprising a computer readable storage medium having program instructions embodied therewith, the program instructions, when executed by a computer, cause the computer to perform a method comprising:
identifying, by the computer, anomalous behavior characteristics of a parameter and group of parameters within time series data using an optimal artificial intelligence model of a plurality of artificial intelligence models;
detecting, by the computer, anomalies based on the anomalous behavior characteristics of the parameter and the group of parameters within the time series data;
classifying, by the computer, the anomalies into a corresponding anomaly category;
determining, by the computer, a root cause of the anomalies based on the corresponding anomaly category;
performing, by the computer, one or more action steps to remediate the root cause of the anomalies;
inputting, by the computer, a zone of similar parameter behavioral characteristics into the plurality of artificial intelligence models;
generating, by the computer, a non-linear score for each respective artificial intelligence model of the plurality of artificial intelligence models based on each respective artificial intelligence model processing the zone of similar parameter behavioral characteristics; and
identifying, by the computer, the optimal artificial intelligence model in the plurality of artificial intelligence models based on comparing the non-linear score of each respective artificial intelligence model.

* * * * *